United States Patent [19]

Acampora

[11] Patent Number: 5,553,074
[45] Date of Patent: Sep. 3, 1996

[54] TRANSMISSION FORMAT IN PACKET BASED COMMUNICATIONS

[75] Inventor: Anthony S. Acampora, Freehold, N.J.

[73] Assignee: Trustees of Columbia University in the City of New York, Morningside Heights, N.Y.

[21] Appl. No.: 206,442

[22] Filed: Mar. 4, 1994

[51] Int. Cl.$^6$ .............................. H04L 12/56; H04B 7/26
[52] U.S. Cl. .................. 370/94.1; 370/94.2; 370/94.3; 370/95.1; 370/95.3
[58] Field of Search .................. 370/94.1, 94.2, 370/94.3, 95.1, 95.3, 95.2, 60, 60.1; 340/825.44, 825.08, 825.54; 455/33.1, 33.2, 33.3, 53.1, 54.2, 54.1, 56.1; 379/59, 60, 63, 58

[56] References Cited

U.S. PATENT DOCUMENTS

| | | | |
|---|---|---|---|
| 4,649,543 | 3/1987 | Levine | 371/41 |
| 4,789,983 | 12/1988 | Acampora et al. | 370/96 |
| 4,807,222 | 2/1989 | Amitay | 370/85 |
| 4,972,506 | 11/1990 | Uddenfeldt | 455/33 |
| 5,168,498 | 12/1992 | Adams et al. | 370/95.1 |
| 5,199,031 | 3/1993 | Dahlin | 370/110.1 |
| 5,237,570 | 8/1993 | Smolinske et al. | 370/95.1 |
| 5,303,226 | 4/1994 | Okanoue et al. | 370/95.3 |
| 5,303,240 | 4/1994 | Borras et al. | 370/95.3 |
| 5,383,187 | 1/1995 | Vardakas et al. | 370/94.3 |

FOREIGN PATENT DOCUMENTS 0286614  10/1988  European Pat. Off. .

OTHER PUBLICATIONS

Z. Zhang et al., Performance of a Modified Polling Strategy for Broadband Wireless LANs in a Harsh Fading Environment, IEEE Communications Society, 1991, pp. 1141–1146.
Z. Zhang et al., Performance of a Modified Polling Strategy for Broadband Wireless LANs in a Harsh Fading Environment, Telecommunications Systems I (1993), pp. 279–294.
K. Zhang et al., An Integrated Voice/Data System for Mobile Indoor Radio Networks Using Multiple Transmission Rate, IEEE Global Telecommunications Conference and Exhibition, Globecom '89, vol. 3, pp. 1366–1370.
Funkfernsprechen bitweise, Funkschau 24/1986, pp. 50–52.

*Primary Examiner*—Wellington Chin
*Attorney, Agent, or Firm*—Brumbaugh, Graves, Donohue & Raymond

[57] ABSTRACT

In packet based communications, e.g., in cellular or mobile communications, information is formatted as transmission frames. The transmission frames have equal length or duration, and they have a common format. Each transmission frame includes a frame marker field, a signaling field and a communication field. The frame marker field delimits the transmission frame, the signaling field includes communications system information, and the communication field includes information for communication between a user and a base station.

22 Claims, 3 Drawing Sheets

TRANSMISSION FORMAT IN PACKET BASED COMMUNICATIONS

The United States Government has certain rights in this invention under Contract CDR-881111 awarded by the National Science Foundation.

Filed of even date is an application entitled "Method and Apparatus for Supporting Mobile Communications in Asynchronous Transfer Mode Based Networks" which is a continuation-in-part application of pending application Ser. No. 08/067,717, filed May 26, 1993 by the present inventor jointly with Mahmoud Naghshineh.

BACKGROUND OF THE INVENTION

The invention relates to packet based communications and to a format of transmission frames used in such communications.

Packet based communications can be used, e.g., in radio-based cellular systems, where mobile users are connected via wireless links to fixed base stations. In packet based communications, digital information packets are transmitted without rigid allocation of "time slots" to users.

Various protocols and formats have been proposed for transmission frames, some of which are reviewed as follows:

U.S. Pat. No. 4,649,543, issued Mar. 10, 1987 to Levine, discloses a radiotelephone system in which data frames include data portions which are interleaved with so-called SAT/SYNC words. Each such word is a 21-bit correlator word which uniquely provides combined radio frequency (RF) frame synchronization, digital SAT (supervisory tone) information, and system state information. After a subscriber unit has requested a digital channel for making a call through a fixed site, this site transmits data frames to the subscriber unit with "dotting" information (001100110011 . . . ) for bit synchronization. If a digital channel to be assigned to the subscriber unit is not the same as the channel currently used by the subscriber unit, a handoff command is transmitted from the fixed site to the subscriber unit to switch to a channel capable of the digital service. After the call is set up, the data portion is used to transmit digitally encoded speech at an effective rate of 9.6 Kb/s.

U.S. Pat. No. 5,237,570, issued Aug. 17, 1993 to Smolinske et al., discloses a radiotelephone data transfer system in which a down-link message to a mobile consists of six fields termed synchronization, acknowledgement, time slot number, register select, destination address and data fields. An up-link message by a mobile consists of four fields, namely priority, register select, source address and data fields.

U.S. Pat. No. 4,807,222, issued Feb. 21, 1989 to Amitay, discloses scanning of a portion of a transmission frame to determine whether the frame is occupied by a packet.

U.S. Pat. No. 4,789,983, issued Dec. 6, 1988 to Acampora et al. and the paper by Z. Zhang et al., "Performance of a Modified Polling Strategy for Broadband Wireless LANS in a Harsh Fading Environment", *Telecommunications Systems*, Vol. 1 (1993), pp. 279–294 disclose packet based communications with user devices being polled for information regarding communications needs.

The following are concerned with mobile radio systems using time-multiplexed transmission, and are included here as being of general interest. Particular time frame formats are disclosed.

K. Zhang et al., "An Integrated Voice/Data System for Mobile Indoor Radio Networks Using Multiple Transmission Rate," *IEEE Global Telecommunications Conference and Exhibition*, Globecom '89, vol. 3, pp. 1366–1370 discloses a time multiplexing technique in which each time frame is divided into time slots for communicating voice and data. The time slots have different durations, corresponding to two different transmission rates.

U.S. Pat. No. 5,199,031, issued Mar. 30, 1993 to Dahlin, discloses a technique for time division of radio traffic and control channels for communications between a mobile station and an associated base station.

European Patent Document No. 0,286,614 discloses a technique for dividing a radio traffic channel into time slots, and a radio control channel into superframes, each comprising multiple frames of time slots.

U.S. Pat. No. 4,972,506, issued Nov. 20, 1990 to Uddenfeldt, discloses a TDMA technique in which allocated but unoccupied time slots are used to reduce the bit rate, for increased transmission range between mobile and base stations.

The paper entitled "Funkfernsprechen Bitwise" *Funkschau* 24/1986, pp. 50–52, discloses a cellular system for digital wireless communications. FIG. 2 of the paper shows a time frame and communications channel scheme for the system.

The invention described below provides for a particularly convenient transmission frame format for packet based communications.

SUMMARY OF THE INVENTION

In packet based communications as preferred, each transmission frame comprises a frame marker, a signaling field, and a communication field. The frame marker delimits a frame, the signaling field includes network signaling information, and the communication field includes information for communication from an individual user to a base station and from the base station to the user.

DETAILED DESCRIPTION OF PREFERRED EMBODIMENTS

Figure 1:
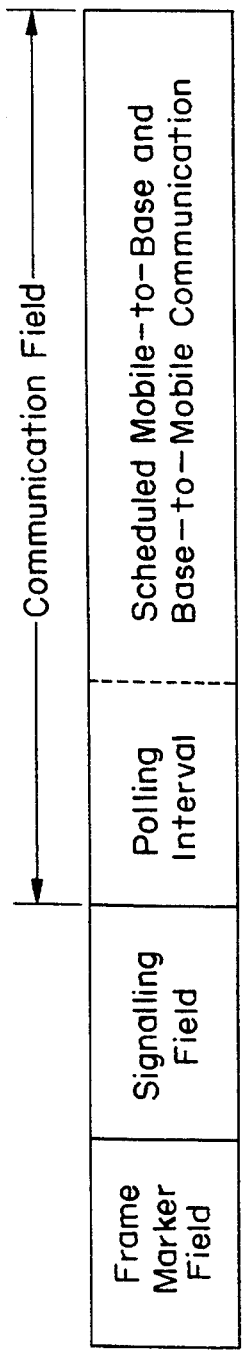
FIG. 1 is a schematic of a transmission frame format in accordance with a preferred embodiment of the invention, comprising a marker field, a signaling field and a communication field.

In accordance with a preferred technique for packet based communication, signals are transmitted in transmission units or "frames" with a common format. As illustrated by FIG. 1, each transmission frame is divided into three contiguous sections or "fields" which are transmitted sequentially, namely (i) a frame marker field, (ii) a signaling field, and (iii) a communication field. All transmission frames are of equal length or duration. In cellular communications, for example, this frame length may be on the order of 20 to 50 milliseconds, which may include approximately 2 milliseconds for the frame marker field and approximately 10 milliseconds for the signaling field. Conveniently, the frame marker field delimits the beginning of a frame, with the end of the frame then delimited by the frame marker field of a following frame. Time-duplexed transmission can be used, with the same communications channel being used for two-way communication.

As shown in FIG. 1 for a particular preferred embodiment in mobile communications, a polling media access scheme is used within the communication field, whereby each base station regularly polls each mobile for which it is currently responsible, to obtain information on instantaneous communication needs of each such mobile. In response to polling, a mobile generates either a "keep alive" packet which is used for base station antenna and/or transversal equalizer adaptation, or a request packet which, in addition to supporting adaptation, also serves to instruct the base to fetch requested information from a wired network and schedule a reply to that mobile. Replies to the polling also provide information for equalizing the channel to each mobile, thereby to assure low link outage. For further details concerning polling, see the above-referenced U.S. Pat. No. 4,789,983, for example.

With reference to information obtained by polling, a base station may then schedule transmission time for mobile-to-base and base-to-mobile communication. Permission to transmit is sequentially given to each mobile by means of a permission token. This scheme results in high radio LAN access utilization efficiency over a wide range of operating conditions.

A preferred transmission frame format can be used in a packet based system for communications between users and a single base station, for example. A system may also comprise a plurality of base stations, and such base stations may be interconnected by a connection tree, e.g., as disclosed in the above-referenced patent application Ser. No. 08/067,717. In such a system, asynchronous transfer mode (ATM) may be used.

Figure 3:
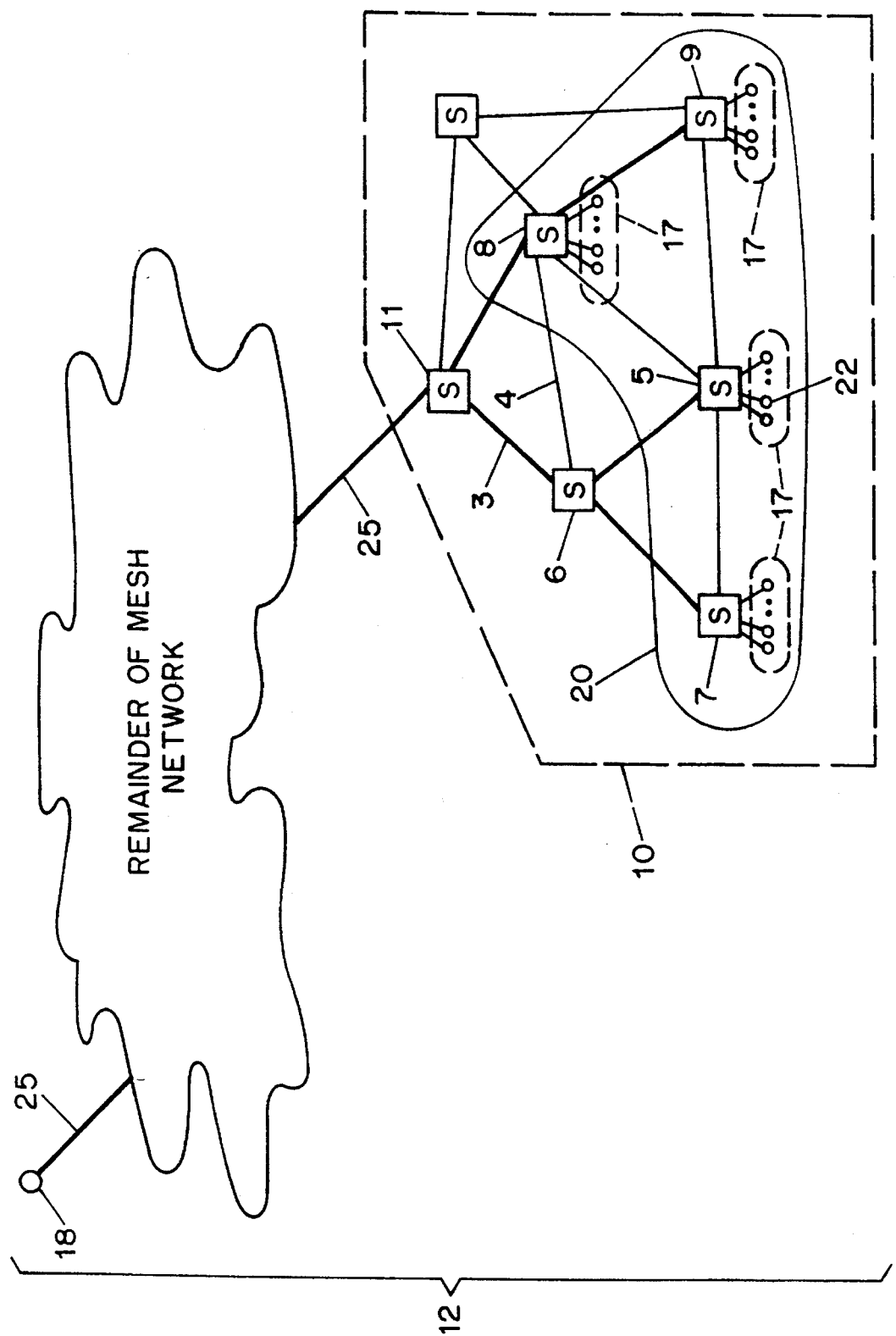
FIG. 3 is a schematic of a cellular communications system comprising base stations with transmitters and receivers for transmission frames in accordance with a preferred embodiment of the invention.

For specific illustration, in the case of a packet-switching system for cellular communications, FIG. 3 shows a mesh network 12. The system provides a user with a "connection tree" comprising actual and potential communications paths between a user's actual and potential base stations and a "root".

At call setup time, a connection tree 10 within the communications network 12 is defined for a mobile user. The connection tree 10 established within the mesh network 12 extends a connection from a fixed point 11 of the network, called the root, to each one of the base stations 17 in the neighborhood 20 of the mobile user. The base station in charge of a mobile user is called the mobile user's access point, base station 22 in this example. The neighborhood 20 may be defined as the area within a predetermined distance of the mobile user's access point 22. A connection tree 10 provides a route, referred to as a virtual channel connection, to the mobile user's access point 22 as well as a virtual channel connection for each of its neighboring mobile access points 17 such that a concatenation of one of these virtual channel connections with another virtual channel connection 25 provides an end-to-end connection in which the mobile user can be the source or destination of communications traffic. At the time a connection tree 10 for a mobile user is set up, a unique connection tree ID is assigned to the user.

The connection tree 10 is set up with reference to the mobile user's location. This is the case whether the mobile user is the source or destination of a call. In both instances, the connection tree 10 will be set up at the mobile user's first interaction with a base station 17.

FIG. 3 represents just one of a large number of possible connection tree configurations. In FIG. 3, connection tree links are shown with thick lines, such as link 3, and other links of the network are shown with narrow ones, such as link 4.

At call setup time, the mobile user is communicating to a base station 22 connected to switching node 5. Switching nodes 7, 8, and 9 are the switches to which all the neighboring base stations 17 are connected. In any end-to-end connection for which the mobile user is the source or the destination, the communication path is divided into two parts. One part of the path is contained within the connection tree 10. This part of the path changes when the mobile user's connection hands off to a different base station.

The other part of the path, which is from the root 11 of the connection tree to the other end of the connection 18, remains fixed throughout most of the connection lifetime. It is noted, however, that the fixed part of the path will not always be necessary. A mobile user may wish to communicate with a destination, fixed or mobile, within the same connection tree. In this scenario, the communications will be routed to the root of the connection tree, but instead of then being switched out of the tree and through a fixed route, the communications will instead be routed back into the tree to the intended recipient. Thus, the two-part path consists of two connection trees rather than a connection tree and a fixed route.

Whenever the user reaches the boundary of the connection tree 10, a new connection tree is established so that the neighboring base stations of the mobile user's access point belong to a new connection tree. This procedure is called the connection tree handoff. Any time there is a handoff from one base station 17 to another, the current connection is disabled and the connection terminating at the new mobile access point is enabled. The part 25 of the path in the wired network originating at the mobile user's call destination point 18 and terminating at the root 11 of the connection tree is fixed and reused.

Figure 4:
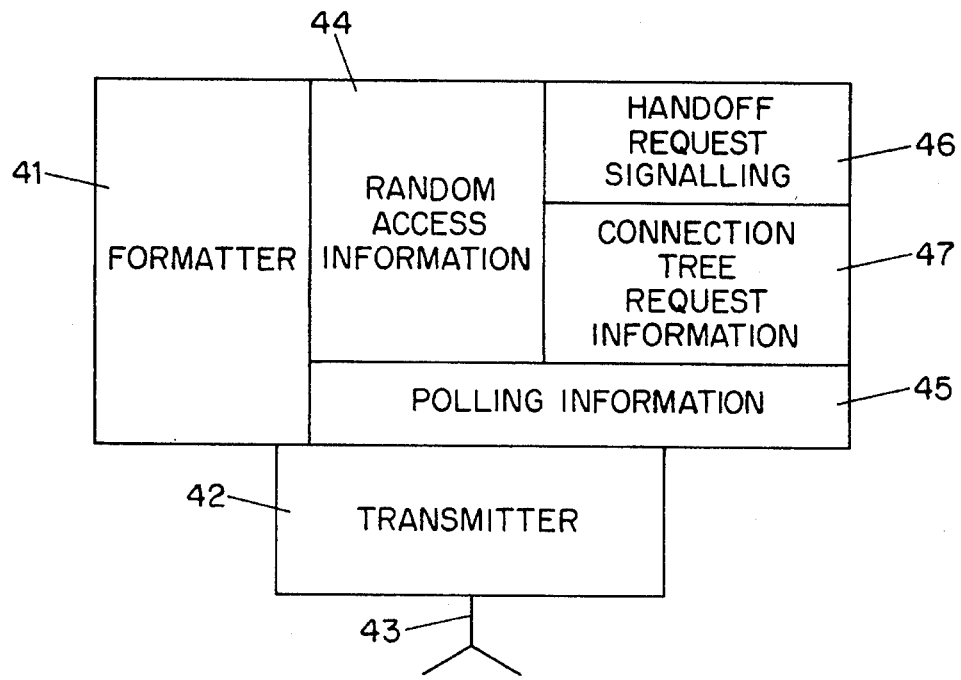
FIG. 4 is a schematic of a user module of a preferred system.
Figure 5:
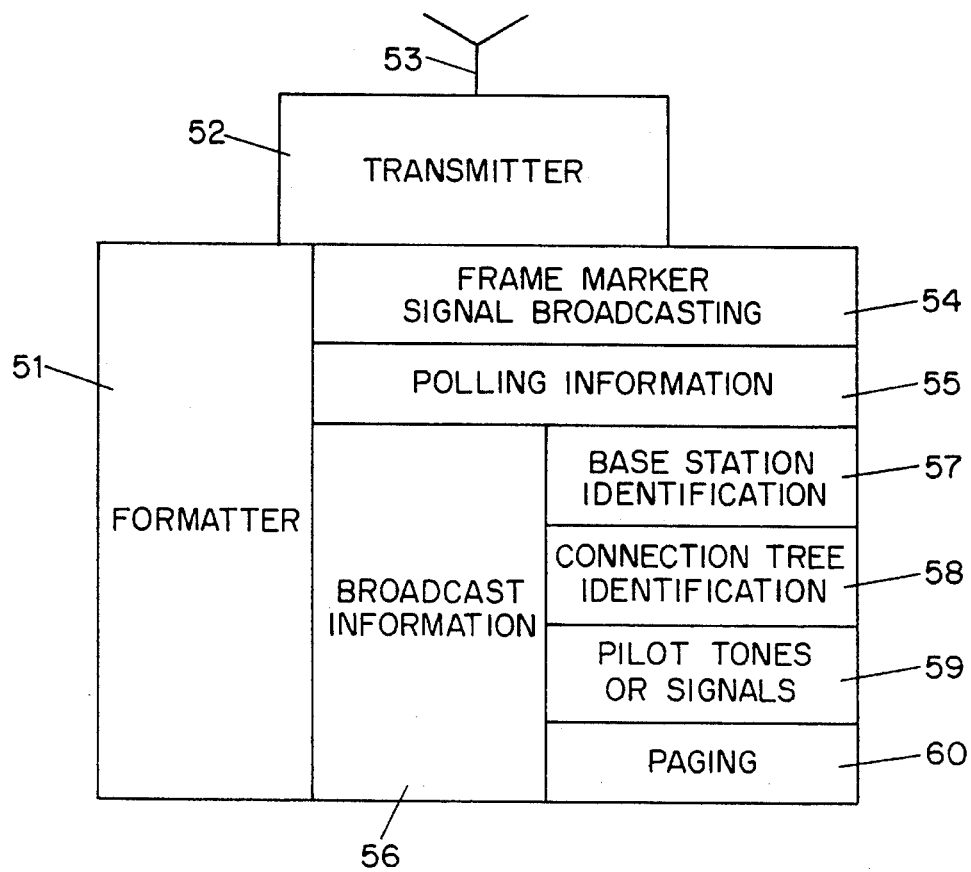
FIG. 5 is a schematic of a base-station module of a preferred system.

Preferred systems features are shown in FIGS. 4 and 5, with FIG. 4 representing a user module and FIG. 5 a base-station module. Included are formatting means 41 and 51, transmission means 42 and 52, and antennas 43 and 53, the latter preferably having an equalizer or taking the form of an array antenna. Included with the base-station module is a means 54 for periodically broadcasting a frame marker signal, and included with the formatting means 41 and 51 are respective means 45 and 55 for including polling information.

Further included, in the base-station module, are means 56 for including broadcast information, with means 57 for including base station identifying information, means 58 for including connection tree identifying information, means 59 for including pilot tones or signals for elements of an array antenna or a transversal equalizer, and means 60 for including a paging signal.

With the user module, included is a means 44 for including random access information, with means 46 for including a handoff request signal and means 47 for including connection tree request information.

Further with reference to FIG. 1, the communications field is used concurrently by all radio cells in the connection tree, with the various base stations managing the communication flow for their mobiles. The frame marker and signaling fields are used sequentially, in sequential frames by the radio cells in the connection tree.

The frame marker field is a unique word periodically and sequentially broadcast from the base stations and is used by the mobiles to establish a basic time reference for start-of-frame. All mobiles which are in either an active state of communication or in a standby state available to accept calls maintain continuous frame marker synchronization. Upon powering up, a mobile will lock onto the frame marker broadcast from one of the base stations, thereby establishing its basic timing reference.

Figure 2:
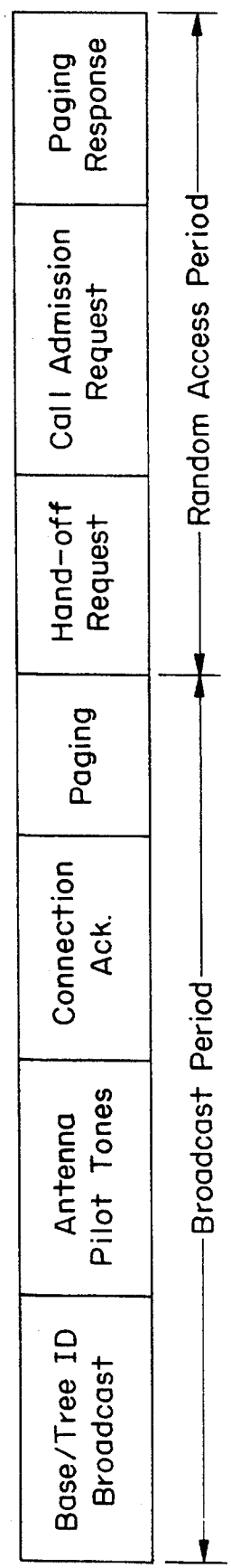
FIG. 2 is a schematic of an exemplary signaling field included in a transmission frame as shown in FIG. 1.

The signaling field of the transmission frame, in an exemplary embodiment as illustrated by FIG. 2, is used to admit a given mobile to the polling sequence of a given base station. This field is subdivided into a broadcast period (base to mobile) and a random access period (mobile-to-base), neither of which contain any communication signals. The first segment of the broadcast field is used to uniquely identify the cell site associated with that frame, as indicated by the base station-ID, and the connection tree to which that base station belongs. In the case of an adaptive array, for equalization of the delay distortion introduced by the multipath propagation environment, this is followed by pilot tones transmitted sequentially at a common frequency by the various antenna elements of that base station's array. An equivalent set of pilot signals can be transmitted during this time segment if a transversal equalizer is used. With only one base station sending its pilots in each frame, the pilot signals broadcast in successive frames are processed by each mobile in the connection tree to determine those base stations to which a satisfactory channel can be established. By continuously monitoring these pilot signals, each mobile can decide when it wishes to initiate handoff for improved transmission quality, as the channel to its current base station may become unusable, e.g., due to user mobility and/or changes in the propagation environment. Monitoring of the pilot signals also serves to decide as to which base station to hand off to, e.g., to the one to which the strongest channel can be established, or to any one chosen at random from those to which a satisfactory channel can be established.

Since the frame marker and signaling fields of each frame are associated with exactly one base station, a mobile can request to join a given base station's polling sequence by signaling its request during the handoff request segment of the frame associated with that base station. The handoff request field is randomly accessed, e.g., by ALOHA or ALOHA with capture, and successful receipt is acknowledged by the base station during the connection acknowledgment of some later frame's signaling field broadcast period.

A mobile can also request the establishment of a new connection tree, which request must be processed by the connection tree's admission controller. The request involves randomly accessing the Call Admission Request segment of the desired base station's signaling field. Acknowledgment of successful receipt of the request and decision to admit are in the connection acknowledgment field of some later frame. Finally, a call may be placed to a given user by means of the paging segment of the signaling field, with the called mobile's ID successively broadcast by all base stations in the connection tree. When the mobile hears its page, it replies with a paging response in the signaling field of a frame associated with a base station to which a satisfactory channel can be established. Since the paging response is randomly accessed, paging continues until a paging response is produced or a time-out interval elapses, as the mobile may not be located within that connection tree, or the mobile may not be in standby mode.

While the above is a description of the invention in preferred embodiments, various modifications, alternate constructions and equivalents may be employed, only some of which have been described above. Therefore, the above description and illustration should not be taken as limiting the scope of the invention which is defined by the appended claims.

I claim:

1. A packet based communications method for communicating between at least one base station and a plurality of users, comprising:

using a transmission frame to carry formatted, time-sequenced messages, the transmission frame comprising (i) a frame marker field which delimits the transmission frame, (ii) a signaling field which comprises communications system information, and (iii) a communication field which comprises user-provided/destined information, the frame marker field, signaling field and communication field being in a predetermined order and each one of the fields having a predetermined length; and transmitting the transmission frame carrying the formatted messages over at least one communications channel between users and the at least one base station.

2. The method of claim 1, comprising periodic broadcasting by the at least one base station, of a frame marker signal in the frame marker field.

3. The method of claim 1, wherein formatting comprises including polling information in the communication field.

4. The method of claim 1, wherein formatting comprises including base-to-user broadcast information and user-to-base random-access information in the signaling field.

5. The method of claim 4, wherein including broadcast information comprises including base station identifying information.

6. The method of claim 4, wherein including broadcast information comprises including connection tree identifying information.

7. The method of claim 4, wherein including broadcast information comprises including pilot tones for elements of an array antenna.

8. The method of claim 4, wherein including broadcast information comprises including pilot signals for a transversal equalizer.

9. The method of claim 4, wherein including broadcast information comprises including a paging signal.

10. The method of claim 4, wherein including random-access information comprises including a handoff request signal.

11. The method of claim 4, wherein including random-access information comprises including connection tree request information.

12. A packet based communications system for communicating between at least one base station and a plurality of users, comprising:

formatting means for formatting messages according to a transmission frame comprising (i) a frame marker field which delimits the transmission frame, (ii) a signaling field which comprises communications system information, and (iii) a communication field which comprises user-provided/destined information, the frame marker field, signaling field and communication field being in a predetermined order and each one of the fields having a predetermined length; and transmission means for transmitting the transmission frame carrying the formatted messages over at least one communications channel between users and the at least one base station.

13. The system of claim 12, wherein the at least one base station comprises means for periodically broadcasting a frame marker signal in the frame marker field.

14. The system of claim 12, wherein the formatting means comprises means for including polling information in the communication field.

15. The system of claim 12, wherein the formatting means comprises means for including base-to-user broadcast information and means for including user-to-base random-access information in the signaling field.

16. The system of claim 15, wherein the means for including base-to-user broadcast information comprises means for including base station identifying information.

17. The system of claim 15, wherein the means for including base-to-user broadcast information comprises means for including connection tree identifying information.

18. The system of claim 15, wherein the means for including base-to-user broadcast information comprises means for including pilot tones for elements of an array antenna.

19. The system of claim 15, wherein the means for including base-to-user broadcast information comprises means for including pilot signals for a transversal equalizer.

20. The system of claim 15, wherein the means for including base-to-user broadcast information comprises means for including a paging signal.

21. The system of claim 15, wherein the means for including user-to-base random-access information comprises means for including a handoff request signal.

22. The method of claim 15, wherein the means for including user-to-base random-access information comprises means for including connection tree request information.

* * * * *